(12) United States Patent
Maruoka et al.

(10) Patent No.: US 11,584,436 B2
(45) Date of Patent: Feb. 21, 2023

(54) DRIVER ASSISTANCE DEVICE

(71) Applicant: AISIN CORPORATION, Kariya (JP)

(72) Inventors: Tetsuya Maruoka, Okazaki (JP);
Kazuya Watanabe, Anjo (JP); Kinji Yamamoto, Anjo (JP); Itsuko Fukushima, Nagoya (JP); Takayuki Nakasho, Anjo (JP)

(73) Assignee: AISIN CORPORATION, Kariya (JP)

( * ) Notice: Subject to any disclaimer, the term of this patent is extended or adjusted under 35 U.S.C. 154(b) by 328 days.

(21) Appl. No.: 16/648,890

(22) PCT Filed: Oct. 3, 2018

(86) PCT No.: PCT/JP2018/037122
§ 371 (c)(1),
(2) Date: Mar. 19, 2020

(87) PCT Pub. No.: WO2019/073885
PCT Pub. Date: Apr. 18, 2019

(65) Prior Publication Data
US 2020/0223482 A1    Jul. 16, 2020

(30) Foreign Application Priority Data

Oct. 10, 2017   (JP) .............................. JP2017-197151

(51) Int. Cl.
*B62D 13/00*    (2006.01)
*B60R 1/00*    (2022.01)
(Continued)

(52) U.S. Cl.
CPC ............ *B62D 13/005* (2013.01); *B60R 1/003* (2013.01); *B62D 15/021* (2013.01);
(Continued)

(58) Field of Classification Search
CPC .. B62D 13/005; B62D 15/021; B62D 15/029; B62D 15/027; B62D 13/06; B62D 13/00;
(Continued)

(56) References Cited

U.S. PATENT DOCUMENTS

| 6,919,917 | B1 | 7/2005 | Janssen |
| 2010/0171828 | A1 | 7/2010 | Ishii |

(Continued)

FOREIGN PATENT DOCUMENTS

| JP | 2003-511288 A | 3/2003 |
| JP | 2009-060499 A | 3/2009 |

(Continued)

OTHER PUBLICATIONS

International Search Report for PCT/JP2018/037122 dated Dec. 25, 2018 (PCT/ISA/210).

*Primary Examiner* — James M Pontius
(74) *Attorney, Agent, or Firm* — Sughrue Mion, PLLC

(57) ABSTRACT

A driver assistance device according to an embodiment includes a coupling angle acquirer that acquires a coupling angle between a towing vehicle and a towed vehicle coupled to the towing vehicle; and a notifier that issues a given notification in the towing vehicle when the towing vehicle is driven with the towing vehicle and the towed vehicle differing in orientation at a given value or more based on the coupling angle, the towing vehicle moves in a given distance or less while maintaining a steering angle, and the steering angle of the towing vehicle enables the towing vehicle and the towed vehicle to be placed in a serial state with the towing vehicle and the towed vehicle substantially matching with each other in orientation.

10 Claims, 11 Drawing Sheets

(51) Int. Cl.
*B62D 15/02* (2006.01)
*H04N 7/18* (2006.01)
(52) U.S. Cl.
CPC ........... *B62D 15/029* (2013.01); *H04N 7/183*
(2013.01); *B60R 2300/10* (2013.01); *B60R 2300/20* (2013.01); *B60R 2300/303* (2013.01); *B60R 2300/806* (2013.01); *B60R 2300/8086* (2013.01)
(58) Field of Classification Search
CPC . B60R 1/003; B60R 2300/10; B60R 2300/20; B60R 2300/303; B60R 2300/806; B60R 2300/8086; B60R 2021/0069; B60R 2300/70; B60R 1/00; H04N 7/183; H04N 7/181
See application file for complete search history.

(56) References Cited

U.S. PATENT DOCUMENTS

| | | | |
|---|---|---|---|
| 2012/0249796 A1 | 10/2012 | Kinoshita et al. | |
| 2014/0160276 A1 | 6/2014 | Pliefke et al. | |
| 2018/0346024 A1* | 12/2018 | Lavoie | B62D 15/027 |

FOREIGN PATENT DOCUMENTS

| | | |
|---|---|---|
| JP | 2011-131678 A | 7/2011 |
| JP | 2016-137802 A | 8/2016 |

* cited by examiner

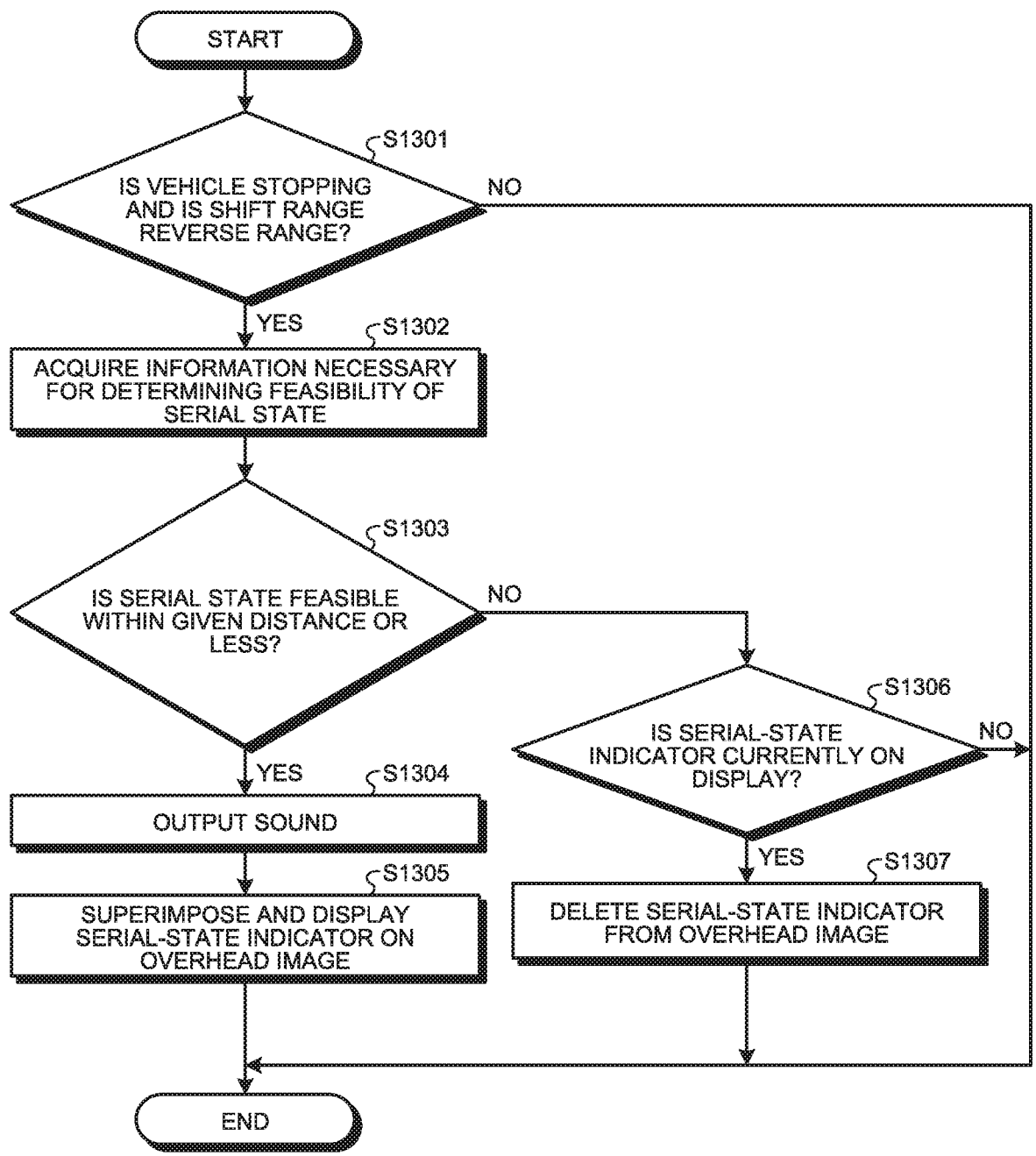

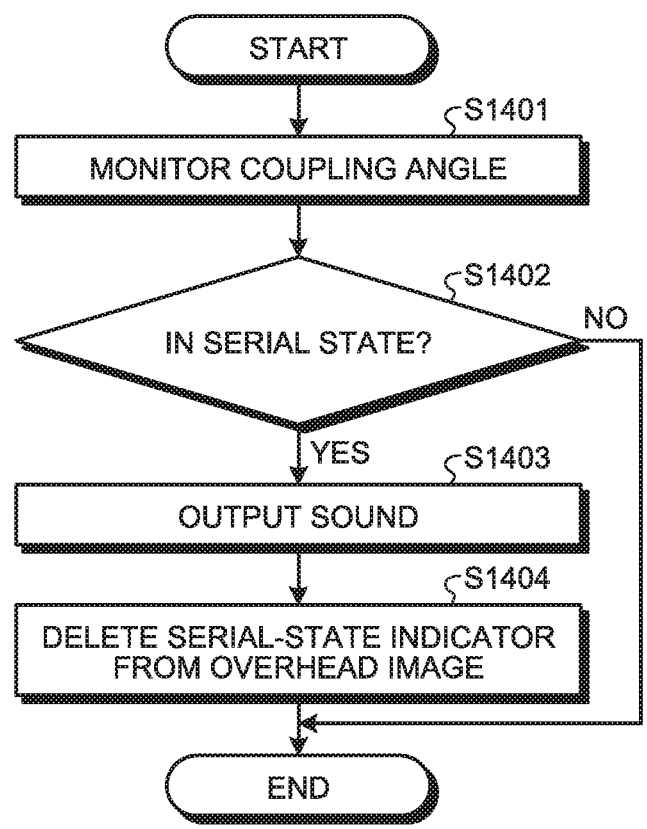

DRIVER ASSISTANCE DEVICE

CROSS-REFERENCE TO RELATED APPLICATIONS

This application is a national stage application of International Application No. PCT/JP2018/037122, filed Oct. 3, 2018, which designates the United States, incorporated herein by reference, and which claims the benefit of priority from Japanese Patent Application No. 2017-197151, filed Oct. 10, 2017, the entire contents of which are incorporated herein by reference.

TECHNICAL FIELD

Embodiments of the present invention relate generally to a driver assistance device.

BACKGROUND ART

Conventionally, driver assistance techniques for a towing vehicle coupled to a towed vehicle are proposed. Among such techniques, as an example, displaying a peripheral image representing the surroundings of the towing vehicle to visually inform the driver of the current state of a towing vehicle and a towed vehicle is known.

CITATION LIST

Patent Literature

Patent Document 1: US 2014/0,160,276 A

SUMMARY OF INVENTION

Problem to be Solved by the Invention

In driving a towing vehicle coupled to a towed vehicle with a difference in orientation being a certain degree or more based on a coupling angle, it may be requested to decrease the difference and place the towing vehicle and the towed vehicle in a serial state that their orientations substantially coincide.

However, the conventional peripheral image display technique may allow the driver to recognize the current state of the towing vehicle and the towed vehicle from the peripheral image, but it may be difficult to allow the driver to determine how to drive the vehicle to place the towing vehicle and the towed vehicle in the serial state.

In view of this, an object of one embodiment is to provide a driver assistance device that can notify the driver of how to drive a towing vehicle to place the vehicle and a towed vehicle in a serial state with their orientations substantially matching.

Means for Solving Problem

According to an embodiment, a driver assistance device includes a coupling angle acquirer that acquires a coupling angle between a towing vehicle and a towed vehicle coupled to the towing vehicle; and a notifier that issues a given notification in the towing vehicle when the towing vehicle is driven with the towing vehicle and the towed vehicle differing in orientation at a given value or more based on the coupling angle, the towing vehicle moves in a given distance or less while maintaining a steering angle, and the steering angle of the towing vehicle enables the towing vehicle and the towed vehicle to be placed in a serial state with the towing vehicle and the towed vehicle substantially matching with each other in orientation. As configured above, by the given notification the driver can be notified of the driving that enables the serial state.

In the driver assistance device, after determination of the difference in orientation based on the coupling angle as being the given value or more while the towing vehicle is stopping to move backward, the notifier issues the given notification when the towing vehicle starts moving backward while maintaining the steering angle, moves backward in the given distance or less, and the steering angle enables the serial state. As configured above, the driver can easily find the manner of driving that enables the serial state, by waiting for the given notification while performing stationary steering to change the steering angle in the vehicle-stop state.

The driver assistance device further includes an image processor that generates an overhead image as a peripheral image from a result of imaging by an imager to be provided at the towing vehicle. The overhead image represents surroundings of the towing vehicle. The overhead image represents the surroundings of the towing vehicle viewed from above. The notifier includes a display processor that issues the given notification by displaying a serial-state indicator on the overhead image in a superimposed manner. The serial-state indicator represents a relationship between a current state and the serial state of the towing vehicle and the towed vehicle. As configured above, the driver assistance device can notify, in a visible manner, the driver of the information that the serial state is feasible if maintaining the current steering angle, by displaying the relationship between the current state and the serial state of the towing vehicle and the towed vehicle in an overhead mode in an easily understandable manner.

In the driver assistance device, the serial-state indicator includes a first indicator. The first indicator indicates an orientation of the towing vehicle and the towed vehicle in the serial state. As configured above, the first indicator can serve to easily provide the driver with image representation of the orientation of the towing vehicle and the towed vehicle in future serial state.

In the driver assistance device, the serial-state indicator includes a second indicator indicating a turning direction of the towing vehicle until the serial state is fulfilled. As configured above, the second indicator can serve to provide the driver with image representation of the vehicle's movement (turn) until the serial state is fulfilled.

In the driver assistance device, the serial-state indicator includes a third indicator indicating an estimated position of the towing vehicle in the serial state when fulfilled. As configured above, the third indicator can serve to easily provide the driver with image representation of how the towing vehicle is positioned in future serial state.

In the driver assistance device, after the towing vehicle starts moving during display of the serial-state indicator, the display processor continues to display the serial-state indicator. After the serial state is actually fulfilled, the display processor deletes the serial-state indicator from the overhead image. As configured above, the driver can easily find whether or not the serial state is actually fulfilled by checking deletion of the serial-state indicator.

In the driver assistance device, the image processor generates a two-sided image as the peripheral image. The two-sided image represents situations on right and left sides of the towing vehicle simultaneously. After the towing vehicle starts moving during display of the serial-state indicator and a given condition is satisfied, the display processor displays the two-sided image representing situations on the right and left sides of the towing vehicle. As configured above, the driver can easily find the serial state by checking whether or not the towed vehicle equally (symmetrically) appears on the right and left sides of the towing vehicle on the two-sided image.

In the driver assistance device, the notifier includes a sound processor that issues the given notification by outputting first sound. As configured above, the first sound can serve to notify, in an audible and easily understandable manner, the driver of feasibility of the serial state if maintaining the current steering angle.

In the driver assistance device, the sound processor outputs second sound when the towing vehicle starts moving in response to the output of the first sound and the serial state is actually fulfilled. As configured above, the driver can easily check whether or not the serial state is actually fulfilled, by recognizing the second sound.

BRIEF DESCRIPTION OF DRAWINGS

FIG. 13 is an exemplary schematic flowchart illustrating driver assistance processing by the driver assistance device of the embodiment; and FIG. 14 is an exemplary schematic flowchart illustrating processing by the driver assistance device of the embodiment when the towing vehicle starts moving backward while the serial-state indicator is displayed.

DESCRIPTION OF EMBODIMENTS

Hereinafter, embodiments will be described with reference to the accompanying drawings. Configurations of embodiments described below, and actions and results (effects) attained by the configurations are merely exemplary, and are not intended to limit the scope of the embodiments.

First, various structures mounted on a towing vehicle and a towed vehicle (trailer) towed by the towing vehicle to which the embodiment is applied will be schematically described with reference to FIGS. 1 to 3.

Figure 1:
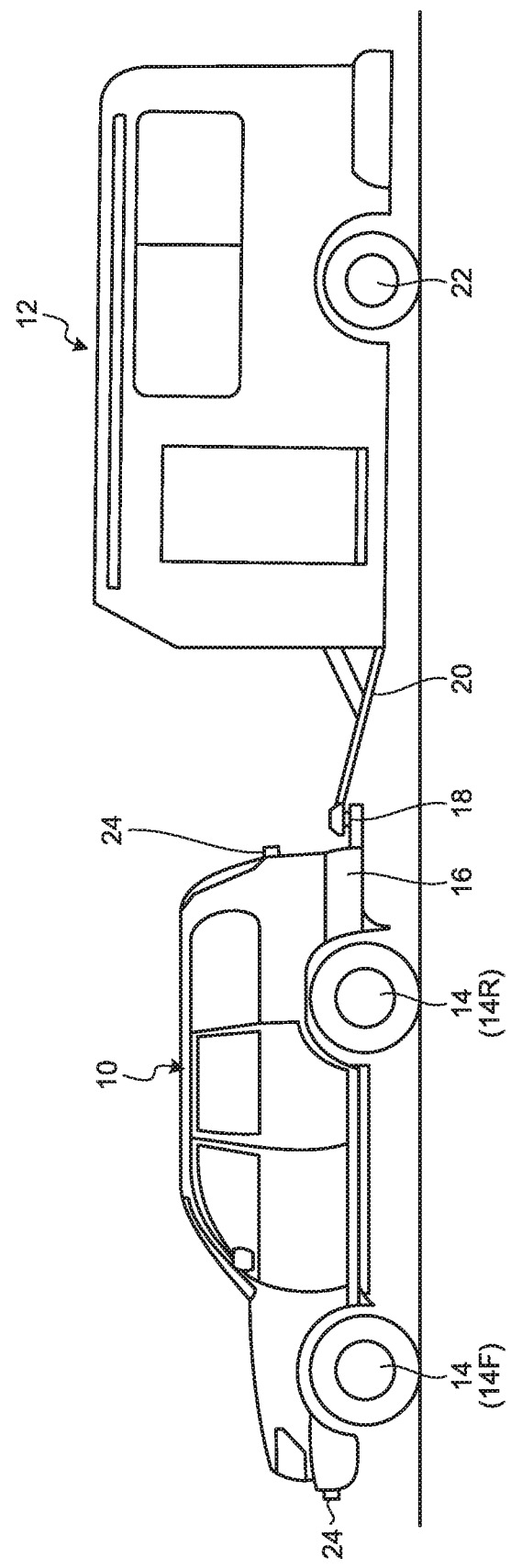
FIG. 1 is an exemplary schematic side view illustrating a towing vehicle and a towed vehicle coupled together according to an embodiment.

FIG. 1 is an exemplary schematic side view illustrating a towing vehicle 10 and a towed vehicle 12 coupled together according to an embodiment. FIG. 2 is an exemplary schematic top view illustrating the towing vehicle 10 and the towed vehicle 12 coupled together in the embodiment. FIG. 3 is an exemplary schematic view illustrating an interior 10a of the towing vehicle 10 in the embodiment.

Figure 2:
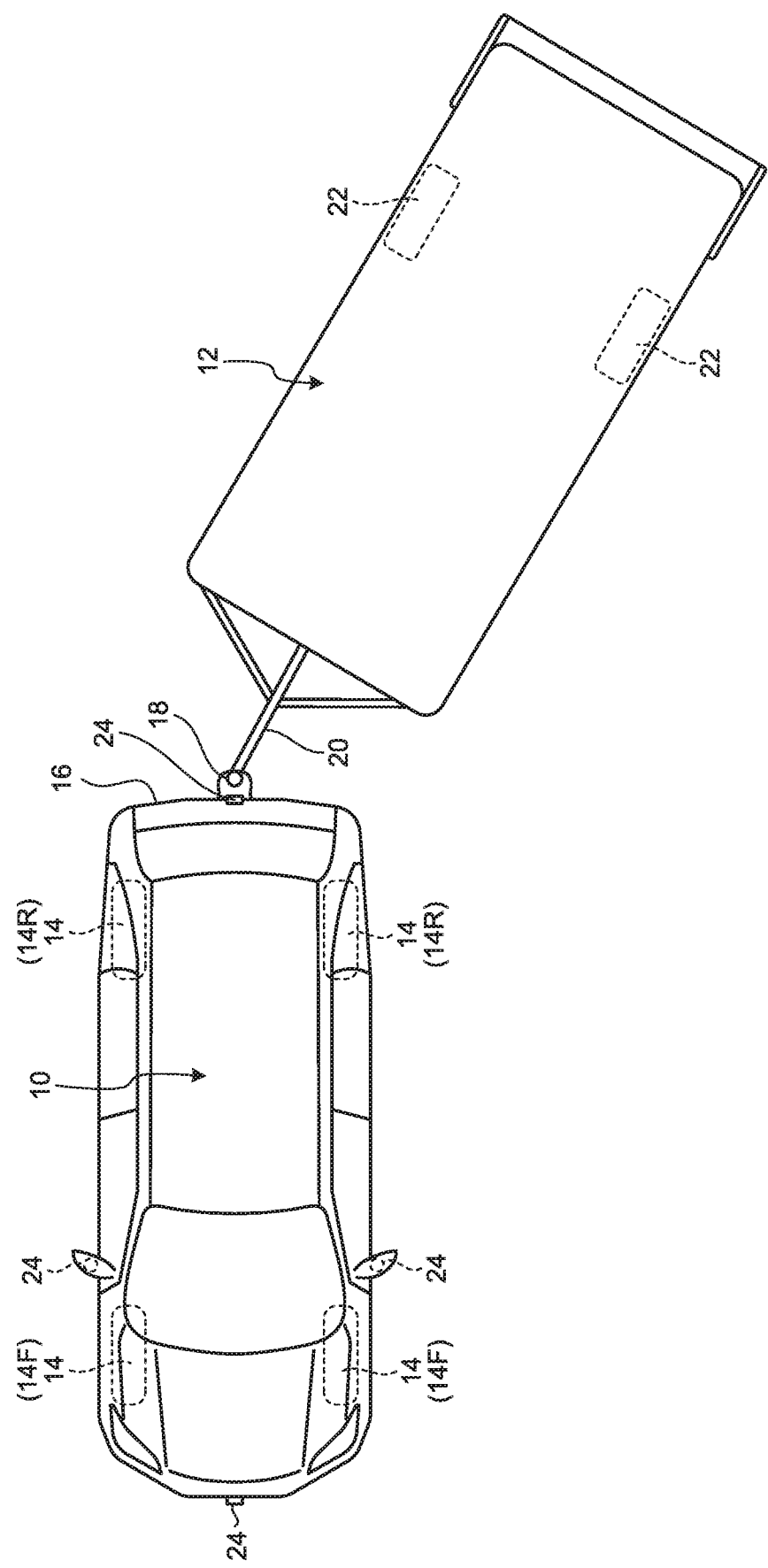
FIG. 2 is an exemplary schematic top view illustrating the towing vehicle and the towed vehicle coupled together in the embodiment.

As illustrated in FIGS. 1 and 2, the towing vehicle 10 according to the embodiment represents a four-wheeled automobile including a pair of right and left front wheels 14F and a pair of right and left rear wheels 14R. Hereinafter, the front wheels 14F and the rear wheels 14R may be collectively referred to as wheels 14 for the sake of simplicity. In the embodiment, the skid angle of part or all of the four wheels 14 is controlled by a driver's steering of a steering wheel 42 (see FIG. 3).

The towing vehicle 10 according to the embodiment may be an automobile including an internal combustion (engine not illustrated) as a power source, an automobile including an electric motor (not illustrated) as a power source, or an automobile including both of the internal combustion and the electric motor as a power source. Further, the towing vehicle 10 may be a sport utility vehicle (SUV), a pickup truck including a rear deck, or a general passenger vehicle.

The towing vehicle 10 of the embodiment can incorporate various transmissions and various devices or units (systems, parts and components, and etc.) for driving the internal combustion or the electric motor. The method, number, and layout of the devices related to the driving of the wheels 14 in the towing vehicle 10 can be variously set (changed).

As illustrated in FIGS. 1 and 2, the towing vehicle 10 of the embodiment includes a towing device (hitch) 18 on a rear bumper 16. The towing device 18 projects from, for example, a bottom center of the rear bumper 16 in a vehicle lateral direction. The towing device 18 includes, for example, a hitch ball vertically (top to bottom of the vehicle) standing and having a spherical distal end. The hitch ball is covered with a coupler located at the distal end of a coupling member 20 fixed to the front end of the towed vehicle 12. As structured above, the towing vehicle 10 and the towed vehicle 12 are coupled to each other while the towed vehicle 12 can swing (turn) with respect to the towing vehicle 10 in the vehicle lateral direction. Thus, in this structure, the hitch ball of the towing device 18 serves to transfer forward, backward, leftward, and rightward movements to the towed vehicle 12 via the coupling member 20, and receive acceleration or deceleration power.

As illustrated in FIGS. 1 and 2, the towed vehicle 12 according to the embodiment includes a pair of trailer wheels 22. The following describes driven wheels as an example of the trailer wheels 22. That is, in the following, the towed vehicle 12 is represented by a driven vehicle including no driving wheel or steering wheel. In the example of FIGS. 1 and 2, the towed vehicle 12 is illustrated as a box-type vehicle including at least one of a riding space, a living area, and a storage space. In the embodiment, however, the towed vehicle 12 may be of a deck type on which luggage (e.g., a container or a boat) is to be loaded.

As illustrated in FIGS. 1 and 2, the towing vehicle 10 includes imagers 24 at the front and rear ends and on the right and left side mirrors. The imagers 24 are, for example, digital cameras including a built-in image sensor such as a charge coupled device (CCD) image sensor or a complementary metal oxide semiconductor (CMOS) image sensor. The imagers 24 generate images of the surroundings of the towing vehicle 10 at a given frame rate, and outputs the images (image data). The images can be frame images constituting a moving image.

The imager 24 is located at the rear end of the towing vehicle 10 and generates an image of a region including the coupling member 20 and at least the front end of the towed vehicle 12, to output the image for detecting a coupling posture (coupling or non-coupling or coupling angle) of the towing vehicle 10 and the towed vehicle 12. The imager 24 is located at the front end of the towing vehicle 10 and generates an image of a region ahead of the towing vehicle 10, to output the image for allowing the driver to recognize a situation ahead of the towing vehicle 10. The imagers 24 are located at the right and left side mirrors of the towing vehicle 10 and generate images of a lateral region of the towing vehicle 10, to output the image for allowing the driver to recognize a situation on the lateral side of the towing vehicle 10.

In the embodiment, for example, the images generated by the plurality (four) of imagers 24 are subjected to a variety of image processing including viewpoint conversion and synthesis to generate peripheral images representing situations around the vehicle, that is, images with a wider viewing angle than one imager 24 generates, and overhead images representing the surroundings of the towing vehicle 10 as viewed from above.

Figure 3:
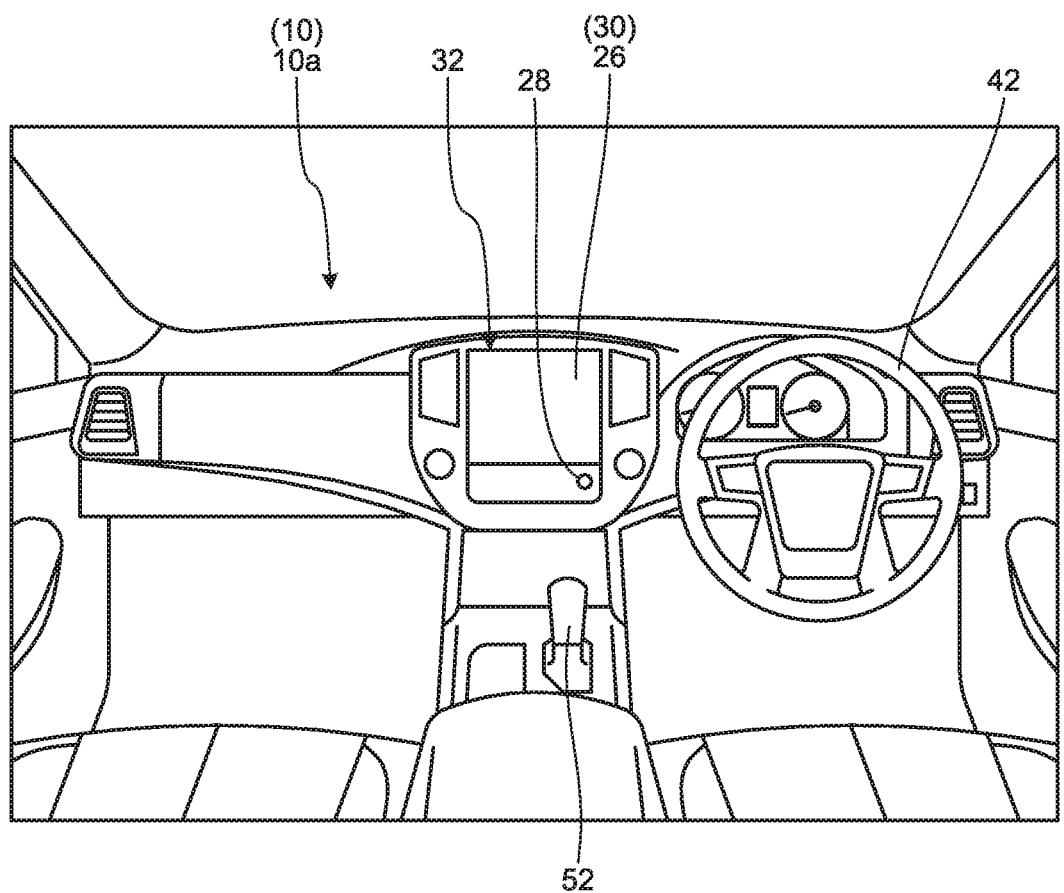
FIG. 3 is an exemplary schematic view illustrating an interior of the towing vehicle in the embodiment.

As illustrated in FIG. 3, the interior 10a of the towing vehicle 10 is equipped with a monitor device 32 including a display device (display) 26 that can output various images and a sound output device (speaker) 28 that can output various kinds of sound. The monitor device 32 is located at the center of a dashboard in the interior 10a in the vehicle lateral direction (horizontal direction). The display device 26 includes a liquid crystal display (LCD) or an organic electroluminescent display (GELD), for example.

The display device 26 is provided with a touch panel 30 in an image display region, that is, a display screen. The touch panel 30 can detect positional coordinates of the vicinity (including contact) of a pointer, such as a finger or a stylus, on the display screen. Thereby, a user (such as the driver) can view an image on the display screen of the display device 26, and operate the touch panel 30 (for example, touch operation) with the pointer such as a finger or a stylus to input various operations.

In the embodiment, the monitor device 32 may include various physical operational inputs such as a switch, a dial, a joystick, and a push button. In the embodiment, another sound output device may be located at a position different from the position of the monitor device 32 in the interior 10a. In this case, the sound output device 28 and another sound output device can both output various kinds of sound information. In the embodiment, the monitor device 32 may be able to display various kinds of system information such as a navigation system and an audio system.

The towing vehicle 10 according to the embodiment includes a driver assistance system 100 having a driver assistance function for the towing vehicle 10 while coupled with the towed vehicle 12. The driver assistance system 100 may also have a driver assistance function for the towing vehicle 10 while not coupled with the towed vehicle 12. The following will schematically describe various kinds of hardware of the driver assistance system 100 according to the embodiment with reference to FIG. 4.

Figure 4:
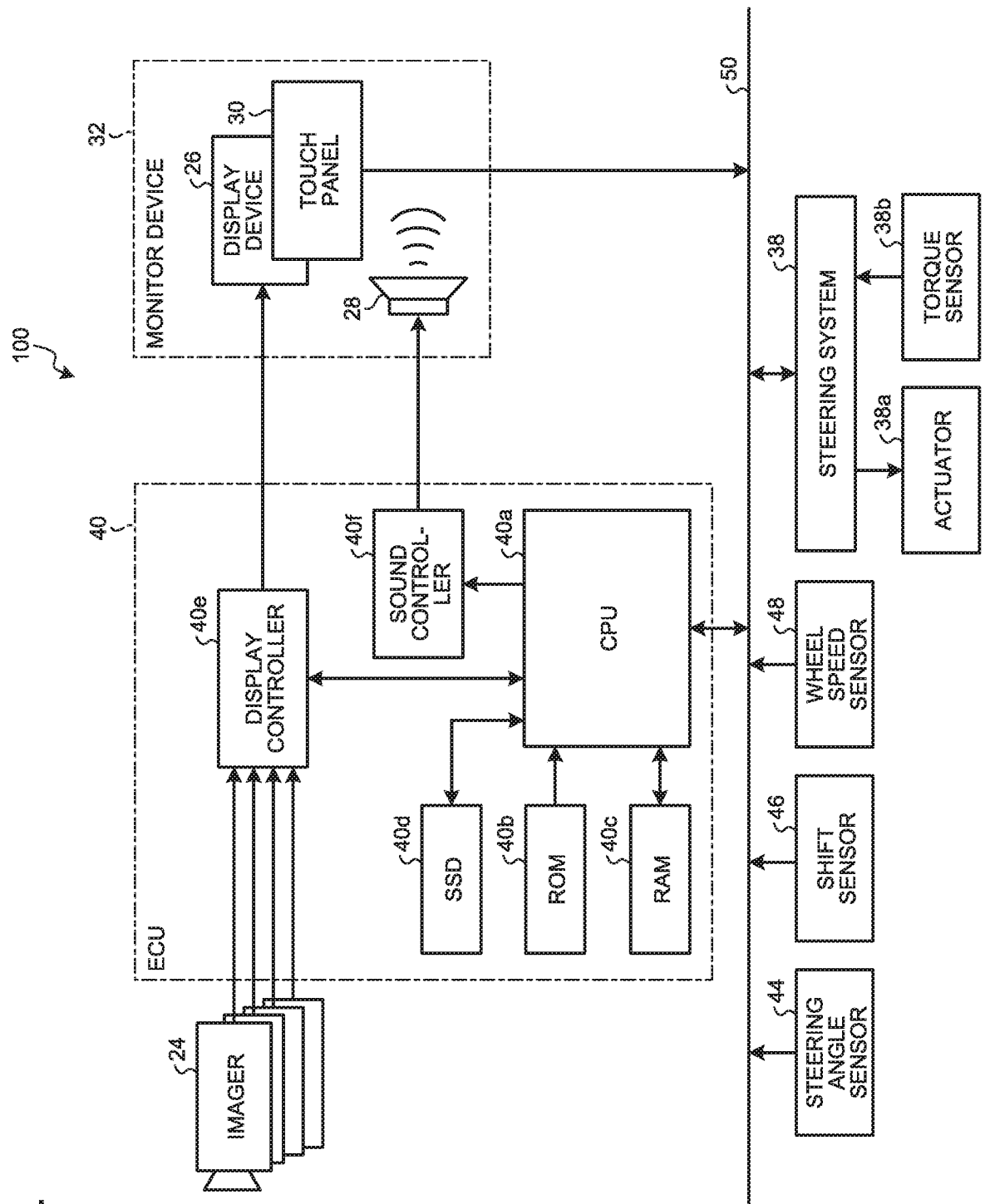
FIG. 4 is an exemplary schematic block diagram illustrating a hardware configuration of a driver assistance system according to the embodiment.

FIG. 4 is an exemplary schematic block diagram illustrating a hardware configuration of the driver assistance system 100 according to an embodiment. Configurations, arrangement, and electrical connection of various kinds of hardware as described below are merely exemplary, and can be variously set (changed).

As illustrated in FIG. 4, the driver assistance system 100 according to the embodiment includes the imagers 24, the monitor device 32, a steering system 38, an electronic control unit (ECU) 40, a steering angle sensor 44, a shift sensor 46, and a wheel speed sensor 48.

The monitor device 32, the steering system 38, the ECU 40, the steering angle sensor 44, the shift sensor 46, and the wheel speed sensor 48 are communicably connected to one another via an in-vehicle network 50 being an electric communication line. The in-vehicle network 50 is represented by, for example, a controller area network (CAN).

The steering system 38 includes an electric power steering system or a steer-by-wire (SBW) system. The steering system 38 is connected to an actuator 38a and a torque sensor 38b. The steering system 38 serves to operate the actuator 38a under the control of the ECU 40 to steer part or all of the four wheels 14. The torque sensor 38b detects torque generated in response to a driver's operation of the steering wheel 42 (see FIG. 3), and transmits a result of the detection to the ECU 40.

The steering angle sensor 44 serves to detect a driver's steering amount of the steering wheel 42 (see FIG. 3). The steering angle sensor 44 includes, for example, a Hall element, detects a rotation angle of a rotational part of the steering wheel 42 as a steering amount, and transmits a result of the detection to the ECU 40.

The shift sensor 46 detects the position of a movable part of a transmission unit 52 (see FIG. 3) such as a lever, an arm, and a button, and transmits a result of the detection to the ECU 40. The transmission unit 52 is located near a driver's seat in the interior 10a of the towing vehicle 10.

The wheel speed sensor 48 detects the rotational amount of the wheels 14 or the rotational speed of the wheels 14 per unit time, and transmits a result of the detection to the ECU 40. Results of the detection by the wheel speed sensor 48 can be used to estimate the velocity or position of the towing vehicle 10 (and the towed vehicle 12).

The ECU 40 serves as a controller that generally controls the driver assistance system 100. The ECU 40 includes computer resources such as a central processing unit (CPU) 40a, a read only memory (ROM) 40b, a random access memory (RAM) 40c, a solid state drive (SSD) 40d, a display controller 40e, and a sound controller 40f.

The CPU 40a serves as a control unit that generally controls the ECU 40 to perform various kinds of processing. The CPU 40a reads a program from a storage such as the ROM 40b or the SSD 40d, and operates in accordance with a command contained in the program to thereby perform various kinds of processing. The RAM 40c serves as, for example, a work area for the CPU 40a to execute various operations.

The display controller 40e controls image output via the display device 26. The sound controller 40f controls sound output via the sound output device 28.

According to the embodiment, the CPU 40a, the ROM 40b, and the RAM 40c may be mounted on one integrated circuit. Further, in the embodiment, the ECU 40 may include a processor such as a digital signal processor (DSP) or a logic circuit instead of the CPU 40a, as a control unit that controls the ECU 40 to perform various kinds of processing.

As configured above, the ECU 40 according to the embodiment generally controls the respective elements of the driver assistance system 100 by transmitting control signals to the elements of the driver assistance system 100 via the in-vehicle network 50. The ECU 40 can acquire image data from the imagers 24 and the results of the detection from the various sensors via the in-vehicle network 50 for use in the control. The various sensors include the torque sensor 38b, the steering angle sensor 44, the shift sensor 46, and the wheel speed sensor 48. In addition, the ECU 40 can acquire information on inputs to the touch panel 30 via the in-vehicle network 50 for use in the control.

As described above, the driver assistance system 100 according to the embodiment includes a driver assistance function for the towing vehicle 10 while coupled with the towed vehicle 12. Thus, the ECU 40, serving as a controller that generally controls the driver assistance system 100, can display, for example, a peripheral image representing the surroundings of the towing vehicle 10 on the display device 26 to provide the driver with a visual notice of a current state of the towing vehicle 10 and the towed vehicle 12 as driver assistance. Such a peripheral-image display method is conventionally known.

Meanwhile, in driving the towing vehicle 10 coupled to the towed vehicle 12 with a difference in orientation being a certain degree or more based on a coupling angle therebetween, it may be requested to decrease the difference to place the towing vehicle 10 and the towed vehicle 12 in a serial state that their orientations substantially coincide.

However, the conventional peripheral image display method may allow the driver to recognize the current state of the towing vehicle 10 and the towed vehicle 12 from the peripheral image, but it may be difficult to allow the driver to determine how to drive the vehicle to place the towing vehicle 10 and the towed vehicle 12 in a serial state.

In view of this, in the embodiment, a driver assistance device 500 serves as a functional module group implemented in the ECU 40 to perform driver assistance control, and is configured as below to be able to notify the driver of how to drive the vehicle to fulfill the serial state.

Figure 5:
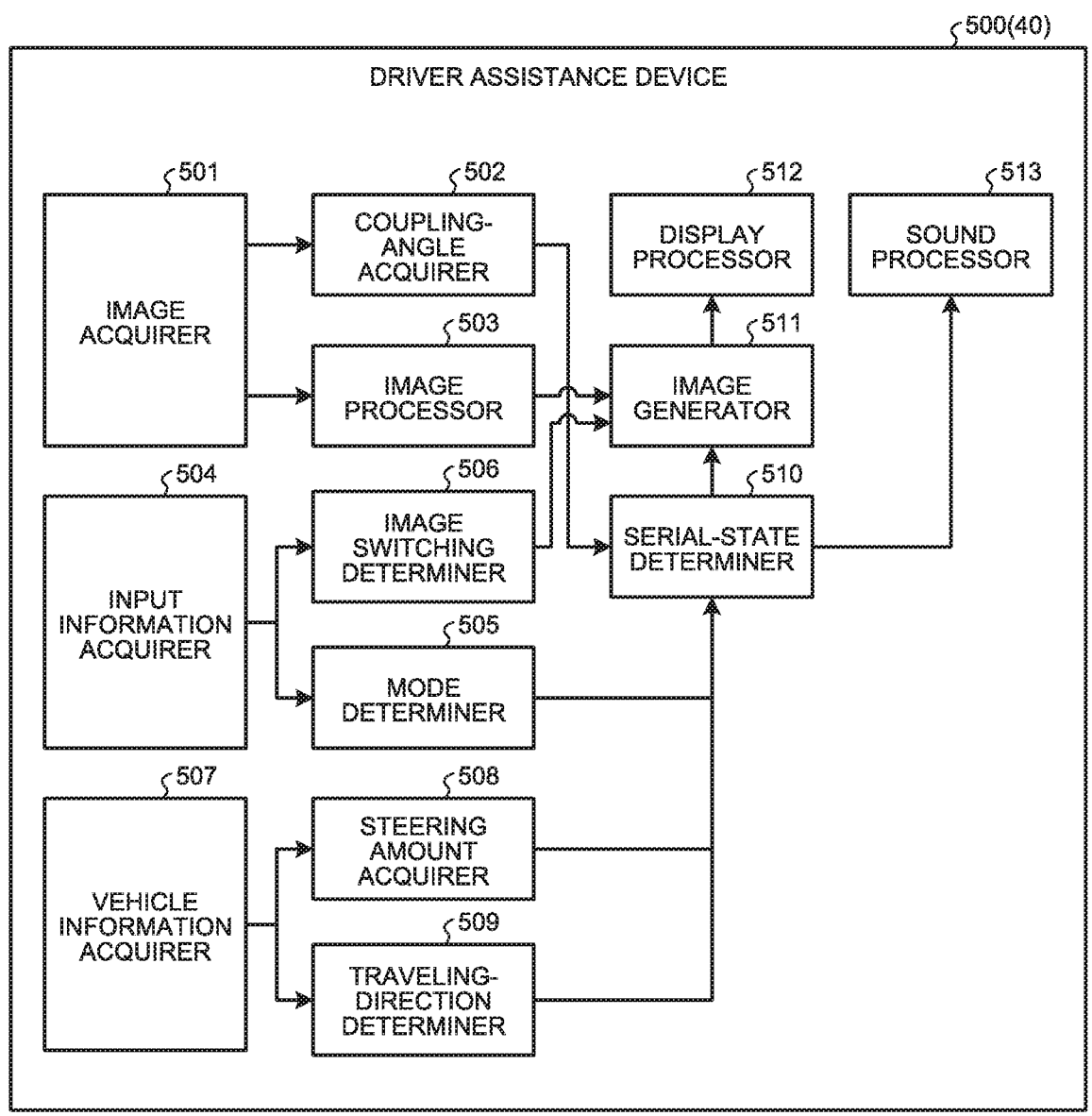
FIG. 5 is an exemplary schematic block diagram illustrating an electronic control unit (ECU) of the driver assistance system to implement the functions of a driver assistance device in the embodiment.

FIG. 5 is an exemplary schematic block diagram illustrating the functions of the driver assistance device 500 implemented in the ECU 40 of the driver assistance system 100 of the embodiment. The driver assistance device 500 is a functional module group implemented in the ECU 40 by the CPU 40a's executing software (control program) stored in the ROM 40b or the SSD 40d in the ECU 40. In the embodiment, part or all of the functional module group illustrated in FIG. 5 may be implemented by dedicated hardware (circuitry).

As illustrated in FIG. 5, according to the embodiment the driver assistance device 500 includes an image acquirer 501, a coupling angle acquirer 502, and an image processor 503.

The image acquirer 501 acquires images (image data) from the imagers 24. As described above, in the embodiment, the image acquirer 501 can acquire four different images including an image of the region ahead the towing vehicle 10, an image of a region behind the towing vehicle 10, and images of regions on the right and left sides of the towing vehicle 10.

The coupling angle acquirer 502 performs image recognition to the images acquired by the image acquirer 501 to find the angle of the towed vehicle 12 with respect to the orientation of the towing vehicle 10, that is, a current coupling angle between the towing vehicle 10 and the towed vehicle 12.

The image processor 503 performs various kinds of image processing including viewpoint conversion or synthesis to the images acquired by the image acquirer 501, and generates a peripheral image representing the surroundings of the towing vehicle 10.

As illustrated in FIG. 5, the driver assistance device 500 according to the embodiment includes an input information acquirer 504, a mode determiner 505, and an image switching determiner 506.

The input information acquirer 504 receives various kinds of input information by the driver. Examples of the input information include operational information input by the driver through the touch panel 30.

The mode determiner 505 determines from the input information received by the input information acquirer 504 whether or not a mode for providing driver assistance to the driver (driver assistance mode) has been selected. In the embodiment, the driver may select a given driver assistance mode (for example, parking assistance mode) through the touch panel 30 while the towing vehicle 10 is towing the towed vehicle 12. Thereby, the driver can receive a feasibility notice regarding the serial state of the towing vehicle 10 and the towed vehicle 12, such as display of the peripheral image and later-described serial-state indicators on the display device 26.

The image switching determiner 506 determines from the input information received by the input information acquirer 504 whether or not to switch kinds (viewpoints) of the peripheral images displayed on the display device 26 at the time of performing the driver assistance. A description of switching the peripheral images is omitted herein, and it will be described in detail later, referring to exemplary screens.

As illustrated in FIG. 5, the driver assistance device 500 of the embodiment includes a vehicle information acquirer 507, a steering amount acquirer 508, and a traveling-direction determiner 509.

The vehicle information acquirer 507 acquires, as vehicle information, information on the specifications of the towing vehicle 10 and the towed vehicle 12 from the SSD 40d and results of the detection from the various sensors such as the torque sensor 38b, the steering angle sensor 44, the shift sensor 46, and the wheel speed sensor 48.

The steering amount acquirer 508 acquires (calculates) a driver's steering amount, that is, a current steering angle of the towing vehicle 10 on the basis of the vehicle information acquired by the vehicle information acquirer 507.

The traveling-direction determiner 509 determines a current traveling direction of the towing vehicle 10 on the basis of the vehicle information acquired by the vehicle information acquirer 507. For instance, from a result of the detection by the shift sensor 46, being one item of the vehicle information, the traveling-direction determiner 509 determines the traveling direction as forward when a set shift range corresponds to a forward gear. When a set shift range (reverse range) corresponds to a reverse gear, the traveling-direction determiner 509 determines the traveling direction as backward.

As illustrated in FIG. 5, the driver assistance device 500 of the embodiment further includes a serial-state determiner 510, an image generator 511, a display processor 512, and a sound processor 513.

The serial-state determiner 510 determines feasibility of placing the towing vehicle 10 and the towed vehicle 12 in the serial state, from the coupling angle acquired by the coupling angle acquirer 502, a result of the determination by the mode determiner 505, the steering angle acquired by the steering amount acquirer 508, and a result of the determination by the traveling-direction determiner 509. Herein, the serial state refers to not only complete match between the orientations of the towing vehicle 10 and the towed vehicle 12 but also a sufficiently small difference therebetween in orientation smaller than a given value.

While the towing vehicle 10 is stopping to move backward in a given driver assistance mode (for example, parking assistance mode) selected, the serial-state determiner 510 determines, in consideration of the current coupling angle between the towing vehicle 10 and the towed vehicle 12, whether the current steering angle of the towing vehicle 10 matches or exceeds the angle at which the towing vehicle 10 and the towed vehicle 12 can be set in the serial state, if the towing vehicle 10 starts moving backward at the current steering angle maintained and moves within a given distance or less.

In the embodiment, in response to actual start of backward movement of the towing vehicle 10 at the steering angle maintained which enables the towing vehicle 10 and the towed vehicle 12 to be in the serial state, the serial-state determiner 510 can monitor the coupling angle (degree of feasibility of serial state) between the towing vehicle 10 and the towed vehicle 12 and determine from a result of the monitoring whether or not the towing vehicle 10 and the towed vehicle 12 are actually placed in the serial state.

The image generator 511 generates an image to display on the display device 26 on the basis of a result of the processing by the image processor 503 and results of the determination by the image switching determiner 506 and the serial-state determiner 510. More specifically, after the serial-state determiner 510 determines that the serial state is feasible, the image generator 511 superimposes a serial-state indicator onto the peripheral image, generated by the image processor 503 according to the result of the determination by the image switching determiner 506, and generates the peripheral image as an image to display on the display device 26. The serial-state indicator indicates a relationship between the current state and the serial state of the towing vehicle 10 and the towed vehicle 12.

The display processor 512 displays the image generated by the image generator 511 on the display device 26. Thus, according to the embodiment, when the peripheral image having the serial-state indicator superimposed thereon appears on the display device 26 during a driver's manipulation of the towing vehicle 10, stopping to move backward, to change the steering angle, the driver can recognize his or her current driving as driving that enables the serial state. That is, the display processor 512 functions as a notifier that issues a given notification in order to notify the driver of such driving that can implement the serial state. The following will describe an example of superimposing the serial-state indicator on an overhead image as a peripheral image. However, the serial-state indicator may also be superimposed on a peripheral image other than the overhead image.

The sound processor 513 outputs sound via the sound output device 28 according to the result of the determination by the serial-state determiner 510. More specifically, the sound processor 513 output given sound via the sound output device 28 after the serial-state determiner 510 determines the serial state as feasible while the driver operates the towing vehicle 10, stopping to move backward, to change the steering angle. Thus, as with the display processor 512, the sound processor 513 functions as a notifier that issues a given notification in order to notify the driver of such driving that enables the serial state.

In the embodiment, the sound processor 513 also outputs given sound after the towing vehicle 10 starts moving backward and the serial-state determiner 510 determines that the serial state is actually fulfilled. Such output sound may be different from or the same as the above output sound while the towing vehicle 10 is stopping.

As configured above, during driving of the towing vehicle 10 coupled with the towed vehicle 12, the driver assistance device 500 of the embodiment changes the screen of the display device 26 of the towing vehicle 10 depending on a change in situation, as follows.

Figure 6:
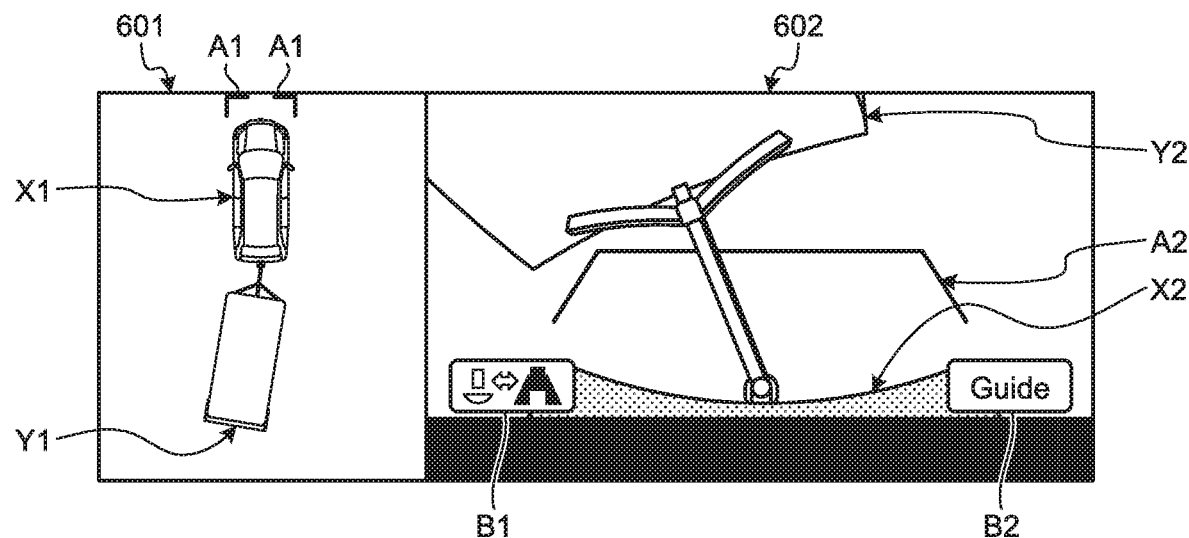
FIG. 6 is an exemplary schematic view illustrating a screen displayed on a display device while the towing vehicle is stopping to move backward in the embodiment.

First, in response to a driver's selection of a given driver assistance mode (for example, parking assistance mode) while the towing vehicle 10 is stopping to move backward, the driver assistance device 500 displays the screen illustrated in FIG. 6 on the display device 26.

FIG. 6 is an exemplary schematic view illustrating a screen on the display device 26 while the towing vehicle 10 is stopping to move backward in the embodiment.

FIG. 6 illustrates the example that the peripheral images, i.e., an overhead image 601 of the surroundings of the towing vehicle 10 viewed from above and a rear image 602 of a situation behind the towing vehicle 10 are displayed in juxtaposition in the traveling direction of the towing vehicle 10.

In the overhead image 601, an indicator (icon or symbol) X1 represents the towing vehicle 10, an indicator Y1 represents the towed vehicle 12 coupled to the towing vehicle 10, and an indicator A1 represents a forward course (and vehicle width) guide for the towing vehicle 10. In the rear image 602, an indicator X2 represents the towing vehicle 10 as viewed from the rear image 602, and an indicator Y2 represents the towed vehicle 12 as viewed from the rear image 602. Further, in the rear image 602, an indicator A2 represents a forward course (and vehicle width) guide for the towing vehicle 10, and buttons B1 and B2 represent a graphical user interface (GUI) that receives given operational inputs such as switching from the rear image 602 to a peripheral image generated at a different viewpoint.

As can be seen from the image illustrated in FIG. 6, the towing vehicle 10 and the towed vehicle 12 are not aligned with each other in terms of orientation. To place the towing vehicle 10 and the towed vehicle 12 in the serial state with their orientations substantially matching, the towing vehicle 10 is to be turned. During the display of the image illustrated in FIG. 6, thus, the driver performs stationary steering of the steering wheel 42 while stopping the towing vehicle 10, in order to find the steering angle of the towing vehicle 10 at which the serial state is feasible.

In the embodiment, as described above, the driver assistance device 500 issues a given notification to the driver of the towing vehicle 10 on the screen or by sound when the steering angle of the towing vehicle 10 matches the angle which enables the serial state through the stationary steering. That is, during display of the image illustrated in FIG. 6, when the driver sets, through stationary steering, the towing vehicle 10 at the steering angle which enables the serial state, the driver assistance device 500 outputs given sound via the sound output device 28 and changes the screen of the display device 26 to the screen as illustrated in FIG. 7.

Figure 7:
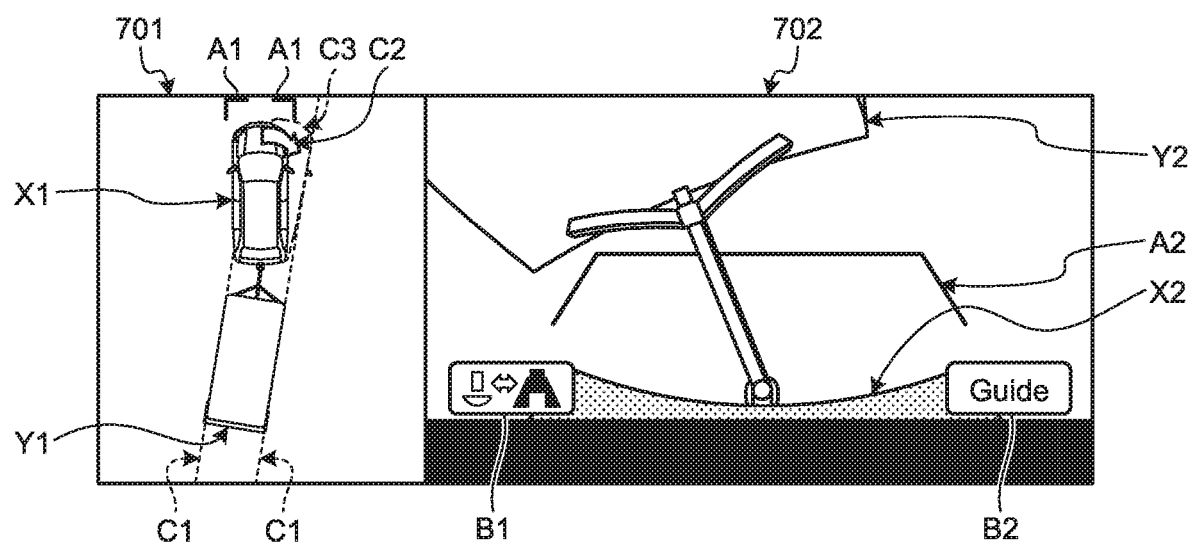
FIG. 7 is an exemplary schematic view illustrating a screen displayed on the display device when a serial state is feasible during display of the screen of FIG. 6 in the embodiment.

FIG. 7 is an exemplary schematic view illustrating a screen displayed on the display device 26 after determination of feasibility of a serial state during display of the screen illustrated in FIG. 6 in the embodiment.

As in the example of in FIG. 6, FIG. 7 depicts the example that the peripheral images, i.e., an overhead image 701 representing the surroundings of the towing vehicle 10 viewed from above and a rear image 702 representing a situation behind the towing vehicle 10 are displayed in juxtaposition. The rear image 702 includes no additional indicator in comparison with the rear image 602 illustrated in FIG. 6, therefore, the overhead image 701 alone will be described below.

In the example illustrated in FIG. 7, the overhead image 701 has superimposed thereon indicators C1 to C3 serving to notify the driver of reaching the steering angle at which the serial state is feasible. The indicators C1 to C3 function as serial-state indicators representing a relationship between the current state and the serial state of the towing vehicle 10 and the towed vehicle 12.

Figure 8:
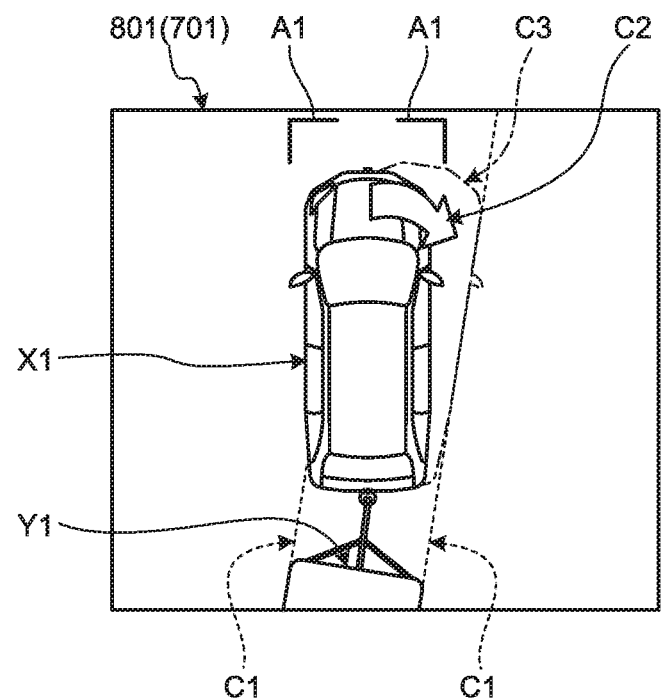
FIG. 8 is an exemplary schematic enlarged view of a region related to serial-state indicators on the screen illustrated in FIG. 7 in the embodiment.

FIG. 8 is an exemplary schematic enlarged view of a region 801 including the serial-state indicators on the screen illustrated in FIG. 7 in the embodiment.

As illustrated in FIG. 8, the indicator C1 indicates the orientation of the towing vehicle 10 and the towed vehicle 12 in the serial state after the towing vehicle 10 moves at the current steering angle maintained. The indicator C2 indicates the turning direction of the towing vehicle 10 until the serial state is fulfilled. The indicator C3 represents an estimated position of the towing vehicle 10 in future serial state when fulfilled. These indicators C1 to C3 serve to provide image presentation that allows the driver to visually easily understand the future state of the towing vehicle 10 and the towed vehicle 12 if the towing vehicle 10 starts moving backward at the current steering angle.

In the embodiment, after the serial-state indicators (indicator C1 to C3) appear on display, the driver assistance device 500 continues to monitor the current steering angle as to whether or not it is equal to or larger than the angle at which the serial state is feasible. That is, in the embodiment, the driver assistance device 500 deletes the serial-state indicators on display when the current steering angle turns to the angle at which the serial state is unfeasible due to a reverse of the orientation of the steering angle, for example. Thus, according to the embodiment, to place the vehicles in the serial state, the towing vehicle 10 is to start up (move backward) with the current steering angle maintained, if the serial-state indicators appear on display.

In response to receipt of a notification by sound or with the serial-state indicators (indicators C1 to C3) as above while the screen illustrated in FIG. 7 (and FIG. 8) is on display, the driver moves the towing vehicle 10 (backward) at the current steering angle maintained to place the towing vehicle 10 and the towed vehicle 12 in the serial state. The driver assistance device 500 then changes the screen of the display device 26 to the screen as illustrated in FIG. 9.

Figure 9:
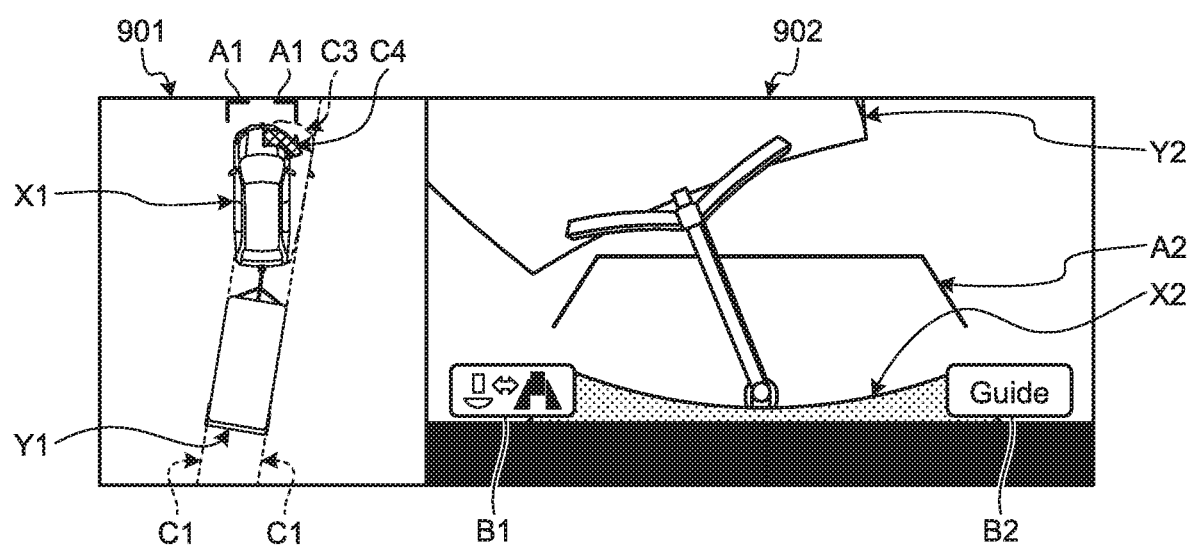
FIG. 9 is an exemplary schematic view illustrating a screen displayed on the display device when the towing vehicle starts moving backward during display of the screen illustrated in FIG. 7 in the embodiment.

FIG. 9 is an exemplary schematic view illustrating a screen displayed on the display device 26 when the towing vehicle 10 starts moving backward during display of the screen illustrated in FIG. 7 in the embodiment.

As in the example illustrated in FIG. 7, FIG. 9 depicts the example that the peripheral images, i.e., an overhead image 901 representing the surroundings of the towing vehicle 10 viewed from above and a rear image 902 representing a situation behind the towing vehicle 10 are displayed in juxtaposition. The rear image 902 includes no additional indicator in comparison with the rear image 702 illustrated in FIG. 7, therefore, the overhead image 901 alone will be described below.

As with the overhead image 701 illustrated in FIG. 7 (and FIG. 8), the overhead image 901 of FIG. 9 has continuously superimposed thereon serial-state indicators indicating a relationship between the current state and the serial state of the towing vehicle 10 and the towed vehicle 12. More specifically, as with the overhead image 701 illustrated in FIG. 7 (and FIG. 8), the overhead image 901 of FIG. 9 has superimposed thereon the serial-state indicators, i.e., the indicator C1 of an orientation of the towing vehicle 10 and the towed vehicle 12 in the serial state and the indicator C3 of an estimated position of the towing vehicle 10 in future serial state when fulfilled.

However, an indicator C4 is superimposed on the overhead image 901 of FIG. 9 in a display mode different from the indicator C2 on the overhead image 701 of FIG. 7 (and FIG. 8). As with the indicator C2, the indicator C4 indicates a turning direction of the towing vehicle 10 until placed in the serial state but is different from the indicator C2 in display mode (color, for instance). Because of this, the driver can easily recognize whether or not the towing vehicle 10 has started moving (backward) by checking the switch from the indicator C2 to the indicator C4. The driver can also use the indicators C1, C3, and C4 as a driving guide for placing the vehicles in the serial state.

Referring to the screen of FIG. 9, the driver turns and moves (backward) the towing vehicle 10 (while maintaining the current steering angle) to move the indicator X1 in the direction of the indicator C4 to overlap with the indicator C3 and to allow the indicator X1 to coincide with the indicator C1 in orientation. Thereby, the driver can place the towing vehicle 10 and the towed vehicle 12 in the serial state. In the serial state, the driver assistance device 500 changes the screen of the display device 26 to the screen as illustrated in FIG. 10.

Figure 10:
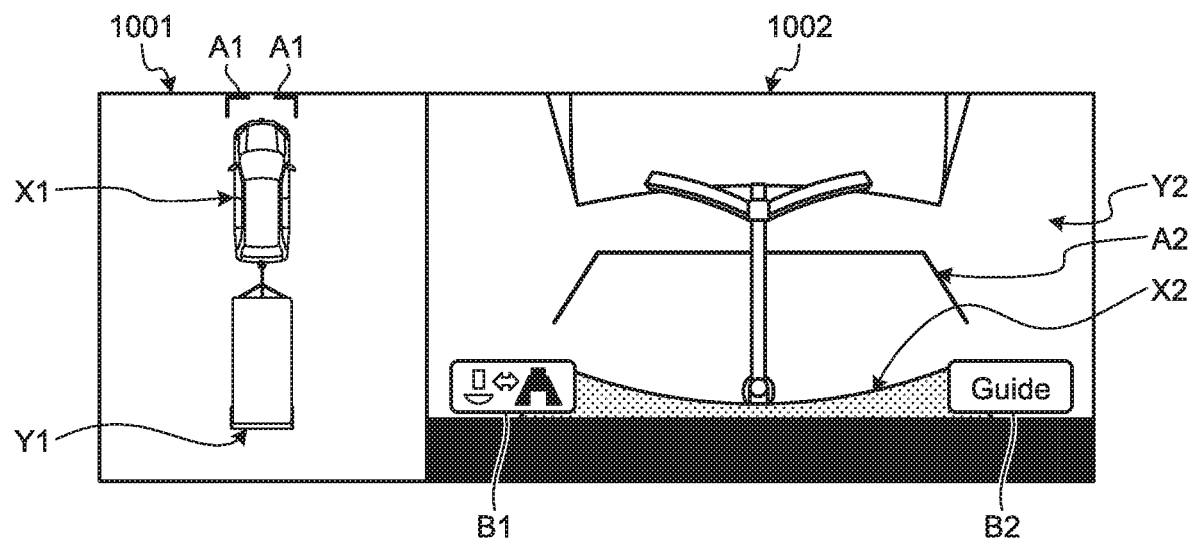
FIG. 10 is an exemplary schematic view illustrating a screen displayed on the display device when the towing vehicle moves further backward than in FIG. 9 to fulfill the serial state in the embodiment.

FIG. 10 is an exemplary schematic view of a screen displayed on the display device 26 depicting that the towing vehicle 10 moves further backward than in FIG. 9 to fulfill the serial state in the embodiment.

As in the example of FIG. 9, FIG. 10 depicts the example that the peripheral images, i.e., an overhead image 1001 representing the surroundings of the towing vehicle 10 viewed from above and a rear image 1002 representing a situation behind the towing vehicle 10 are displayed in juxtaposition. The rear image 1002 includes no additional indicator in comparison with the rear image 902 illustrated in FIG. 9, therefore, the overhead image 1001 alone will be described below.

In the example illustrated in FIG. 10, the serial-state indicators (indicators C1, C3, and C4) displayed on the screen of FIG. 9 are deleted from the overhead image 1001. In the embodiment, the serial-state indicators are deleted as a result of the fulfillment of the serial state of the towing vehicle 10 and the towed vehicle 12. That is, in the embodiment, the driver assistance device 500 monitors the coupling angle (degree of feasibility of the serial state) between the towing vehicle 10 and the towed vehicle 12 while the serial-state indicators are superimposed on the peripheral image during movement of the towing vehicle 10, and deletes the superimposed serial-state indicators from the peripheral image when the towing vehicle 10 and the towed vehicle 12 are actually set in the serial state.

In the embodiment, in response to actual fulfillment of the serial state, the sound output device 28 outputs given sound, as described above. Thus, in the embodiment, the driver can easily recognize the serial state of the towing vehicle 10 and the towed vehicle 12 by checking deletion of the serial-state indicators and the given sound.

As described above, according to the embodiment, the driver can drive the towing vehicle 10 while checking the screen of the display device 26 (and the sound output from the sound output device 28 at given timing), and can thereby easily place the towing vehicle 10 and the towed vehicle 12 in the serial state.

In the embodiment, the display modes (such as shape and color) of the various indicators can be variously set (changed). That is, in the embodiment, the various indicators can be displayed in different colors or in various two-dimensional or three-dimensional shapes. Further, in the embodiment, the display modes of the various indicators may be changed depending on the situation. For example, in the embodiment, the display modes of the various indicators may be changed in accordance with the degree of feasibility of the serial state.

In the embodiment, as described above, in the examples illustrated in FIGS. 6, 7, 9, and 10, the buttons B1 and B2, serving as the GUI for receiving given operational inputs, are superimposed on the rear images 602, 702, 902, and 1002. The button B1, in particular, serves as a GUI that receives inputs to switch the rear images 602, 702, 902, and 1002 to peripheral images generated at different viewpoints. The following will illustrate a screen displayed on the display device 26 in response to selection (touch) of the button B1 on the screen of FIG. 9.

Figure 11:
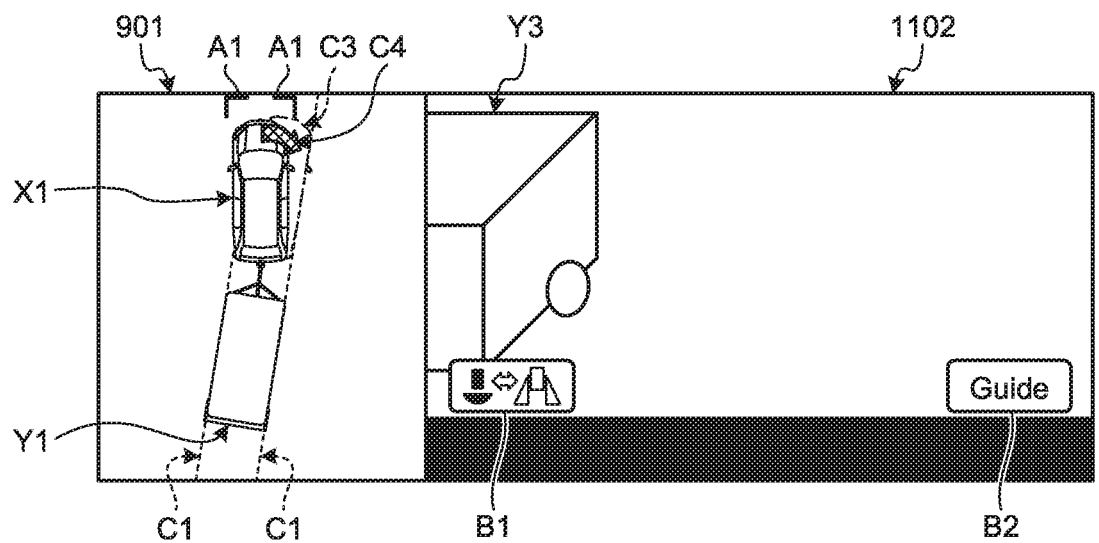
FIG. 11 is an exemplary schematic view illustrating a screen displayed on the display device when a peripheral image is switched to the one from a different viewpoint on the screen illustrated in FIG. 9 in the embodiment.

FIG. 11 is an exemplary schematic view illustrating a screen displayed on the display device 26 after operation to the screen of FIG. 9 to switch the images to peripheral images generated at a different viewpoint in the embodiment.

In the example of FIG. 11, the peripheral images, i.e., an overhead image 901 the same as in FIG. 9 representing the surroundings of the towing vehicle 10 viewed from above, and an inside image 1102 representing a situation lateral to the towing vehicle 10 and inside of the turning are displayed in juxtaposition. The inside image 1102 may be switched from the rear image 902 on display, for example, in response to selection (touch) of the button B1 on the rear image 902 of FIG. 9. Conversely, in response to selection (touch) of the button B1 on the inside image 1102, the inside image 1102 may be switched to the rear image 902. On the inside image 1102, an indicator Y3 represents the towed vehicle 12 viewed from the viewpoint of the inside image 1102.

In the embodiment, upon satisfaction of a given condition during display of the image illustrated in FIG. 11, the inside image 1102 may be switched to a two-sided image representing situations on the right and left sides of the towing vehicle 10 simultaneously. The given condition is, for example, such that the towing vehicle 10 and the towed vehicle 12 approach the serial state. Referring to the two-sided image, the driver can easily implement the serial state by driving the towing vehicle 10 so that the leftward situation and the rightward situation become substantially symmetric to each other.

The following will describe an example that the driver can check the actual serial state by viewing the two-sided image.

Figure 12:
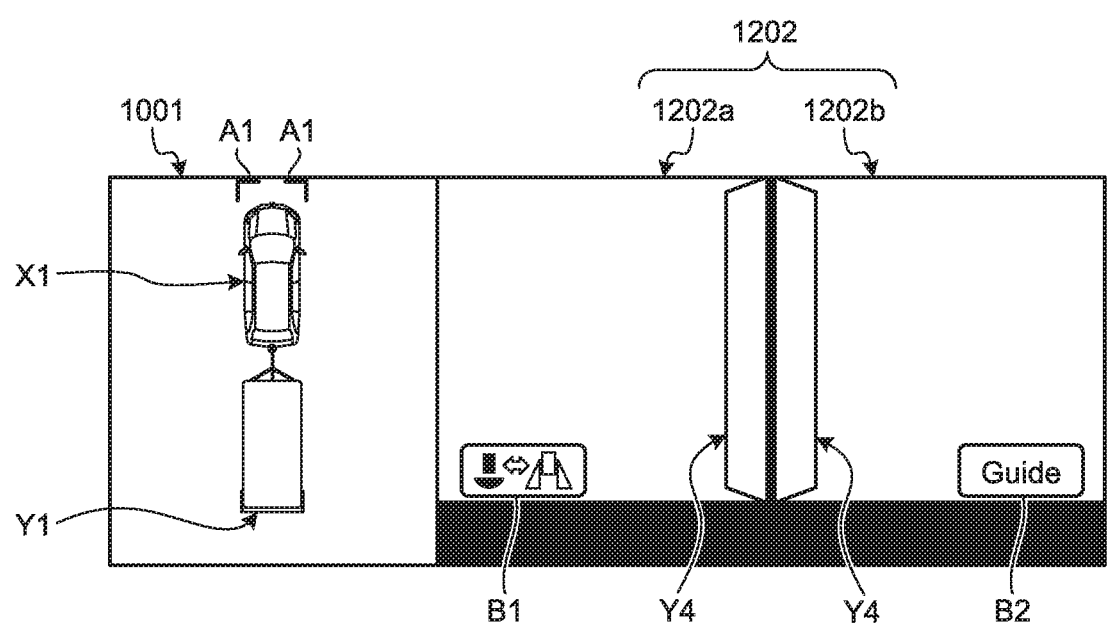
FIG. 12 is an exemplary schematic view illustrating a screen that can be switched from the screen illustrated in FIG. 11 for display on the display device in the embodiment.

FIG. 12 is an exemplary schematic view illustrating a screen that can be switched from the screen illustrated in FIG. 11 on the display device 26 in the embodiment.

FIG. 12 depicts an example that an overhead image 1001 the same as in FIG. 10 is displayed after the towing vehicle 10 and the towed vehicle 12 are placed in the serial state. Moreover, in the example of FIG. 12, a two-sided image 1202 including a right-side image 1202a representing a situation on the right side of the towing vehicle 10 and a left-side image 1202b representing a situation on the left side of the towing vehicle 10 is displayed. On the two-sided image 1202 (right-side image 1202a and left-side image 1202b), indicators Y4 represent the towed vehicle 12 viewed from the respective viewpoints of the right-side image 1202a and the left-side image 1202b.

As illustrated in FIG. 12, in the serial state of the towing vehicle 10 and the towed vehicle 12, the indicators Y4 are displayed in a symmetric (laterally symmetric) manner on the right-side image 1202a and the left-side image 1202b. Thus, the driver can check the serial state by checking whether or not the indicators Y4 are laterally symmetric to each other on the right-side image 1202a and the left-side image 1202b of the two-sided image 1202 as illustrated in FIG. 12.

The following will describe processing to be performed in the embodiment.

FIG. 13 is an exemplary schematic flowchart of driver assistance processing by the driver assistance device 500 according to the embodiment. The driver assistance device 500 repeatedly performs the processing flow of FIG. 13 in response to a selection of a given driver assistance mode (for example, parking assistance mode) on the touch panel 30.

Referring to the processing flow of FIG. 13, in S1301 the driver assistance device 500 determines whether the vehicle (towing vehicle 10) is stopping and whether the vehicle is set to the reverse range.

Upon non-satisfaction of least one of the two conditions in S1301, the driver assistance device 500 ends the processing. However, upon satisfaction of both of the two conditions in S1301, the driver assistance device 500 proceeds to S1302.

In S1302, the driver assistance device 500 acquires (calculates) information necessary for determining feasibility of the serial state. The information necessary for determining feasibility of the serial state is exemplified by the coupling angle between the towing vehicle 10 and the towed vehicle 12 and the current steering angle of the towing vehicle 10, as described above.

In S1303, the driver assistance device 500 determines whether or not the serial state is feasible within a given moving distance or less if the towing vehicle 10 moves backward at the current steering angle. Herein, the difference in orientation between the towing vehicle 10 and the towed vehicle 12 based on the coupling angle therebetween is assumed to be equal to or greater than a given value.

After determining that the serial state is feasible in S1303, the driver assistance device 500 proceeds to S1304.

In S1304, the driver assistance device 500 outputs given sound via the sound output device 28. Through the operation in S1304, the driver assistance device 500 can notify, in an audible manner, the driver of the information that current driving in progress enables the serial state, more specifically, the information that the current steering angle is the angle at which the serial state is feasible.

In S1305, the driver assistance device 500 displays a serial-state indicator indicating a relationship between the current state and the serial state of the towing vehicle 10 and the towed vehicle 12 on an overhead image currently on display in a superimposed manner. Through the operation in S1305, the driver assistance device 500 can notify, in a visual manner, the driver of the information that current driving in progress enables a future serial state, and provide image representation of a change in positional relationship between the towing vehicle 10 and the towed vehicle 12 until the serial state is fulfilled. This completes the processing.

Meanwhile, after determining that the serial state is unfeasible in S1303, the driver assistance device 500 proceeds to S1306.

In S1306, the driver assistance device 500 determines whether or not the serial-state indicator is currently on display. In other words, in S1306, the driver assistance device 500 monitors the steering angle of the towing vehicle 10, and determines whether or not the driver further turns the steering angle in spite of in a serial feasible state to place the vehicles in a serial unfeasible state. The serial-state determiner 510 performs the operation in S1306.

After determining that the serial-state indicator is not currently on display in S1306, the driver assistance device 500 ends the processing. After determining that the serial-state indicator is currently on display in S1306, the driver assistance device 500 proceeds to S1307.

In S1307, the driver assistance device 500 deletes the serial-state indicator currently on display from the overhead image. Through the operation in S1307, the driver assistance device 500 can notify, in a visible manner, the driver of the change from the serial feasible state to the serial unfeasible state. This completes the processing.

FIG. 14 is an exemplary schematic flowchart of the processing to be performed by the driver assistance device according to the embodiment when the towing vehicle 10 starts moving backward during display of the serial-state indicator. The driver assistance device repeatedly performs the processing flow of FIG. 14 until the towing vehicle 10 and the towed vehicle 12 are placed in the serial state.

Referring to the processing flow of FIG. 14, in S1401 the driver assistance device 500 monitors the coupling angle between the towing vehicle 10 and the towed vehicle 12.

In S1402, the driver assistance device 500 determines from a result of the monitoring in S1401 whether or not the towing vehicle 10 and the towed vehicle 12 are placed in the serial state. As described above, in the embodiment, the serial state refers to not only complete match between the orientations of the towing vehicle 10 and the towed vehicle 12 but also a sufficiently small difference therebetween in orientation smaller than a given value.

After determining that the towing vehicle 10 and the towed vehicle 12 are not in the serial state in S1402, the driver assistance device 500 ends the processing. After determining that the towing vehicle 10 and the towed vehicle 12 are in the serial state in S1402, the driver assistance device 500 proceeds to S1403.

In S1403, the driver assistance device 500 outputs given sound via the sound output device 28 to notify, in an audible manner, the driver of the fulfillment of the serial state.

In S1404, the driver assistance device 500 deletes the serial-state indicator currently on display from the overhead image and notifies, in a visual manner, the driver of the fulfillment of the serial state. This completes the processing.

As described above, the driver assistance device 500 according to the embodiment includes the coupling angle acquirer 502 that acquires a coupling angle between the towing vehicle 10 and the towed vehicle 12 coupled to the towing vehicle 10. The driver assistance device 500 further includes the display processor 512 and the sound processor 513 serving as notifiers. In the case of the towing vehicle 10 driven in orientation differing from the towed vehicle 12 at a given value or more based on the coupling angle, the display processor 512 and the sound processor 513 serve to issue a given notification inside the towing vehicle 10 when the towing vehicle 10 starts moving at the current steering angle maintained and moves within a given distance or less, and the steering angle of the towing vehicle 10 turns to the angle or more at which the serial state of the towing vehicle 10 and the towed vehicle 12 with their orientations substantially matching is feasible. Owing to such features, the driver assistance device 500 can issue the given notification to notify the driver of the manner of driving that enables the serial state.

More specifically, in the situation that the towing vehicle 10 is stopping to move backward in an orientation with a difference being a given value or greater from the towed vehicle 12*b* based on the coupling angle, the display processor 512 and the sound processor 513 according to the embodiment issue a given notification with the serial-state indicator or by given sound when the towing vehicle 10 starts moving backward at the current steering angle maintained and moves within a given distance or less, and the steering angle turns to the angle or more at which the serial state is feasible. Owing to such features, the driver can easily find the manner of driving that enables the serial state, by waiting for the given notification while performing stationary steering to change the steering angle in the vehicle-stop state.

The above embodiment has described the example that the driver is notified of the manner of driving that enables the serial state by both the image and the sound. However, the driver assistance device 500 may notify the driver of the manner of driving that enables the serial state by either the image or the sound, or by vibration other than the image and the sound, for example.

The above embodiment has described the example of issuing a notification with a serial-state indicator or by given sound when the serial state is feasible through stationary steering to change the steering angle during the vehicle-stop state. However, the embodiment may be configured to determine in real time during traveling whether the serial state is feasible if the current driving is maintained, and issue a notification with a serial-state indicator or by given sound according to a result of the determination.

While certain embodiments have been described, these embodiments have been presented by way of example only, and are not intended to limit the scope of the invention. Indeed, these novel embodiments described herein may be embodied in a variety of other forms; furthermore, various omissions, substitutions and changes may be made without departing from the spirit of the invention. The accompanying claims and their equivalents are intended to cover such embodiments and the modifications thereof as would fall within the scope and spirit of the invention.

The invention claimed is:
1. A driver assistance device comprising:
a processor or hardware circuitry configured to implement:
coupling angle acquirer that acquires a coupling angle between a towing vehicle and a towed vehicle coupled to the towing vehicle; and
a notifier that issues a predetermined notification in the towing vehicle in response to a determination that the towing vehicle is driven with the towing vehicle and the towed vehicle differing in orientation at a given value or more based on the coupling angle, the towing vehicle moves in a given distance or less while maintaining a steering angle, and the steering angle of the towing vehicle enables the towing vehicle and the towed vehicle to be placed in a serial state with the towing vehicle and the towed vehicle substantially matching with each other in orientation.

2. The driver assistance device according to claim 1, wherein after determination of the difference in orientation based on the coupling angle as being the given value or more while the towing vehicle is stopping to move backward, the notifier issues the given notification when the towing vehicle starts moving backward while maintaining the steering angle, moves backward in the given distance or less, and the steering angle enables the serial state.

3. The driver assistance device according to claim 1, further comprising:
an image processor that generates an overhead image as a peripheral image from a result of imaging by an imager to be provided at the towing vehicle, the overhead image representing surroundings of the towing vehicle, the overhead image representing the surroundings of the towing vehicle viewed from above, wherein
the notifier includes a display processor that issues the given notification by displaying a serial-state indicator on the overhead image in a superimposed manner, the serial-state indicator representing a relationship between a current state and the serial state of the towing vehicle and the towed vehicle.

4. The driver assistance device according to claim 3, wherein
the serial-state indicator includes a first indicator, the first indicator indicating an orientation of the towing vehicle and the towed vehicle in the serial state when fulfilled.

5. The driver assistance device according to claim 3, wherein
the serial-state indicator includes a second indicator indicating a turning direction of the towing vehicle until the serial state is fulfilled.

6. The driver assistance device according to claim 3, wherein the serial-state indicator includes a third indicator indicating an estimated position of the towing vehicle in the serial state when fulfilled.

7. The driver assistance device according to claim 3, wherein after the towing vehicle starts moving during display of the serial-state indicator, the display processor continues to display the serial-state indicator, and
after the serial state is actually fulfilled, the display processor deletes the serial-state indicator from the overhead image.

8. The driver assistance device according to claim 3, wherein the image processor generates a two-sided image as the peripheral image, the two-sided image representing situations on right and left sides of the towing vehicle simultaneously, and
after the towing vehicle starts moving during display of the serial-state indicator and a given condition is satisfied, the display processor displays the two-sided image representing situations on the right and left sides of the towing vehicle.

9. The driver assistance device according to claim 1, wherein the notifier includes a sound processor that issues the given notification by outputting first sound.

10. The driver assistance device according to claim 9, wherein the sound processor outputs second sound when the towing vehicle starts moving in response to the output of the first sound and the serial state is actually fulfilled.

* * * * *